US006681108B1

(12) United States Patent
Terry et al.

(10) Patent No.: US 6,681,108 B1
(45) Date of Patent: Jan. 20, 2004

(54) NETWORK AND METHOD FOR IDENTIFYING ENTITIES SHARING A COMMON NETWORK LOCATION

(75) Inventors: Michael A. Terry, Cambridge, MA (US); Kathleen Ryall, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 716 days.

(21) Appl. No.: 09/639,665

(22) Filed: Aug. 16, 2000

(51) Int. Cl.[7] .................................................. H04Q 7/20
(52) U.S. Cl. ................. 455/412.2; 455/411; 455/456.3; 455/518; 340/5.1
(58) Field of Search .............................. 455/412.2, 411, 455/414.1, 456.3, 456.1, 457, 456.6, 518; 340/5.1, 505, 5.81

(56) References Cited

U.S. PATENT DOCUMENTS

| 4,348,744 A | | 9/1982 | White ......................... 709/253 |
| 5,086,394 A | | 2/1992 | Shapira ......................... 705/1 |
| 6,020,810 A | * | 2/2000 | Har-Even .................... 340/328 |
| 6,032,051 A | | 2/2000 | Hall et al. ................... 455/518 |
| 6,150,937 A | * | 11/2000 | Rackman .................... 340/5.1 |
| 6,249,282 B1 | * | 6/2001 | Sutcliffe et al. ............ 345/751 |

OTHER PUBLICATIONS

Borovoy et al.; "Things that Blink: Computationally Augmented Name Tags", IBM Systems Journal, vol. 35, No. 3&4, 1996.

Borovoy et al.; "Meme Tags and Community Mirrors: Moving from Conferences to Collaboration", pp. 159–168.

Want et al.; "The ParcTab Ubiquitous Computing Experiment".

Want et al.; "The Active Badge Location System", ACM Transactions on Information Systems, vol. 10, No. 1, Jan. 1992, pp. 91–102.

Weilenmann et al.; "Hummingbirds Go Skiing: Using Wearable Computers to Support Social Interaction", From the Digest of Papers for the 3rd International Symposium on Wearable Computers, Oct. 1999, pp. 191–192.

www.lovegetty.com.

Hot Badges, Philips Electronics, www.design.philips.com/vof/vofsite3/vof3ev1/badg1.html.

* cited by examiner

Primary Examiner—Rafael Perez
(74) Attorney, Agent, or Firm—Dirk Brinkman (57) ABSTRACT

A computerized method identifies entities accessing locations in a communications network. A unique identification is associated with a private identification for each entity accessing the network. A known list is maintained for each entity. Each entry in the known list for a particular entity includes the unique identification and private identification of other entities known to the particular entity. A location list is maintained. Each entry in the location list includes a plurality of unique identifications of other entities having shared a common location in the network. A message is generated only if at least two unique identifications of a particular entry of the location list are identical to at least two unique identifications found in the known list of the particular entity. The message includes the associated private identifications of the at least two identical unique identifications.

13 Claims, 9 Drawing Sheets

NETWORK AND METHOD FOR IDENTIFYING ENTITIES SHARING A COMMON NETWORK LOCATION

FIELD OF THE INVENTION

This invention relates generally to a network for introducing individuals or other entities to each other, and more particularly to a social introduction network that relies on a third person to make introductions between strangers.

BACKGROUND OF THE INVENTION

A variety of systems are known for introducing individuals to each other. Introductions effected by agencies suffer from several drawbacks. Strangers have no way of assessing an introductory situation prior to actually meeting, and it is quite common for either or both individuals to be unreceptive to the process because they have limited input in arranging their introduction. Users of such services often also have no control over who will be the recipient of their names, addresses, or telephone numbers with the additional inherent danger that such information can be easily circulated to others.

Bars and clubs can overcome some of the problems by initially allowing strangers to remain anonymous. Although immediate contacts are available, strangers have no prior information about each other and there is the problem of "ice-breaking," that is finding a suitable basis and the privacy to introduce oneself to a total stranger. The only evidence that a "match" is possible is the presence of both persons at the same place and time.

Several technological solutions have been introduced to navigate around these problems. Philips Corporate Design in a web magazine, "Vision of the Future," describes wearable devices (called "Hot Badges") that store private interests. The devices continuously broadcast and receive these private interests using short-range radio frequency (RF) signals. When two badges come within close proximity of each other, the stored interests are exchanged via RF and compared in order to ascertain the amount of shared interests between the two individuals. When the two badges detect common interests, they signal the users to this fact, with the end goal being the facilitation of a social introduction between individuals with similar interests.

Borovoy et al., in "Things that blink: Computationally augmented name tags," IBM Systems Journal, vol. 35, no. 3–4, pp. 488–495 1996, describe digitally-enhanced name tags that store answers to multiple choice questions on a particular topic. The amount of similarity or dissimilarity in the answers is displayed when two users wearing the tags face each other. Like the Hot Badges mentioned above, the enhanced name tags seek to provide individuals with a very rough indication of how much two individuals have in common.

Borovoy et al. in "Meme Tags and Community Mirrors: Moving from Conference to Collaboration," CSCW 98, 159–168, 1998 describe wearable tags (similar to the aforementioned name tags) that store and exchange "memes," or short sayings. When two meme tags face each other, a saying stored on each tag is displayed and the users can acquire the meme on the other tag. While previously mentioned systems have focused on comparing categorized interests between two people, Meme Tags allow users to collect and swap arbitrary phrases to both portray themselves and learn about others.

Weilenmann et al., in "Hummingbirds Go Skiing: Using Wearable Computers to Support Social Interaction," Digest of Papers, 3$^{rd}$ International Symposium on Wearable Computers, 191–192, October 1999, describe a portable, wireless RF-based device that provides awareness of other like devices nearby through sound and a visual display. When another device is detected, the device emits a noise, and the name of the other user of the other device is displayed.

The Lovegety™ is a device that stores simple user interests, and then notifies the user when a device with similar interests is nearby. The device comes in "male" and "female" version so only devices of opposite "gender" recognize each other. The device uses RF technology to continuously broadcast and receive data. Gaydar™ is a similar device intended for gay users.

Friend.Link™ is a portable messaging device that transmits messages via RF signals. Like some of the above described devices, this device stores, exchanges, and compares user-entered interests. However, this device can also send messages to specific devices, a feature not found in the devices described above.

U.S. Pat. No. 4,173,016—Interprivate-introduction signaling system, U.S. Pat. No. 4,348,744—Method and portable apparatus for comparison of stored sets of data, U.S. Pat. No. 5,086,394—Introduction system for locating compatible persons, U.S. Pat. No. 5,920,845—Date matching methods, U.S. Pat. No. 5,950,200—Method and apparatus for detection of reciprocal interests or feelings and subsequent notification, and U.S. Pat. No. 6,020,810—Automatic electronic date/mate finder and method of electronically finding a date/mate all describe portable devices or computer systems that serve to facilitate the introduction of two people with similar interests. The device described in U.S. Pat. No. 5,950,200 distinguishes itself amongst this group by attempting to protect the confidentiality of the users by only signaling two people after they have both indicated interest in each other.

U.S. Pat. No. 6,032,051 Wireless mobile communication devices for group use describes a data exchange mechanism for wireless mobile communication devices. U.S. Pat. No. 5,793,630—High precision spatially defined data transfer system describes wireless data transfer between portable electronic devices. U.S. Pat. No. 5,539,665—Recording and retrieval of information relevant to the activities of a user describes a device that records events relevant to a user.

Sixdegrees Inc provides an Internet based system that allow strangers sharing a common interest to meet through their social network.

Most of the above described devices operate on the basis of common interests. Furthermore, the devices do not usually provide the opportunity for an individual to make the decision of whether or not an introduction between the two strangers is worthwhile. The devices simply make a comparison of interests, and if there is a match of interests, the users are signaled. The problems with such devices are that the lists of interests are likely to be a crude and an imprecise characterization of the person, the backgrounds, habits, and lifestyles of the two users are not considered, and there is no opportunity for a human to intervene and decide whether an introduction is appropriate.

Therefore, there is a need for a social communications network system that allows for the introduction of individuals or other entities on the basis of a shared network location, without having to know what that location of the location is.

SUMMARY OF THE INVENTION

The invention provides a computerized method for identifying entities accessing locations in a communications network. A unique identification is associated with a private identification for each entity accessing the network. A known list is maintained for each entity. Each entry in the known list for a particular entity includes the unique identification and private identification of other entities known to the particular entity.

A location list is maintained. Each entry in the location list includes a plurality of unique identifications of other entities having shared a common location in the network. A message is generated only if at least two unique identifications of a particular entry of the location list are identical to at least two unique identifications found in the known list of the particular entity. The message includes the associated private identifications of the at least two identical unique identifications.

In one aspect, the communications network is local and mobile, and network locations are physical, and in another aspect, the communications network is wide area, and the network locations are virtual.

DETAILED DESCRIPTION OF THE PREFERRED EMBODIMENTS

Motivation

For an individual, building one's social network is a time and energy consuming process. Involvement in social organizations, such as churches or clubs, provides opportunities to expand a social network, but commitments to school or work reduce the amount of time and energy one can dedicate to these social activities. Meeting friends of friends provides another way to expand one's social network, but this method typically requires a common venue so that introductions may be made.

One may also attempt to increase one's social network by going to places commonly known to be "hang-outs" for people wishing to meet new people, e.g., bars and dance clubs. However, in these more anonymous situations, one must be proactive, and little is known about any particular individual ahead of time, creating a high social cost and associated risk for an unknown outcome.

In considering the various ways one can increase one's social network, an introduction of two strangers by a common friend carries great advantages. Though this type of introduction is a relatively easy and efficient social process, it nonetheless features a rich set of cues and information that the two strangers can make use of during and after their initial introduction.

For example, existing knowledge of the common friend, including the type and nature of the relationship with the common friend, can provide some cues about individuals being introduced. Similarly, the common friend can act as a catalyst for the establishment of the new relationship, and the common friend can provide the two individuals with information to provide a "common basis," e.g., by informing them of interests that they share.

Though introductions through a common friend provide a number of benefits, they nonetheless require the common friend to first recognize the potential for the two strangers to meet, and then to act on this observation. Large social events can provide a backdrop for these types of introductions, but such events are typically infrequent.

Outside of such events, the sheer size of a single person's social network, and regular, daily commitments, both work against a person even recognizing the potential that two existing friends may benefit from an introduction to one another.

Overview

Our invention provides means to expand one's social network by recognizing when two strangers share both a similar network location and a mutual friend. To accomplish this, the invention recognizes that two strangers are in the same location.

Thus, in practice, our invention comprises the following basic elements: means for maintaining a list of friends for each individual (known list), means for maintaining a list of pairs of strangers who share a network location (location list), and means for determining if two strangers with a shared location have a mutual friend. If it is determined that two strangers with a mutual friend frequently share locations, then a message is generated for the mutual friend to suggest an introduction between the two strangers.

While it may seem that recognizing a shared location between two individuals should be enough to warrant suggesting an introduction between two strangers, in practice this is not enough. Each day people share a casual location with many strangers: in the park, when commuting, while riding an elevator, shopping, in short, wherever people congregate. Requiring a mutual friend to be shared between two strangers reduces the number of potential introductions and also provides a "human element" to facilitate the process of the introduction between the two strangers.

Basic Elements

Our invention can be implemented in the physical world and/or in virtual worlds. Here, we describe elements common to both implementations.

Figure 1:
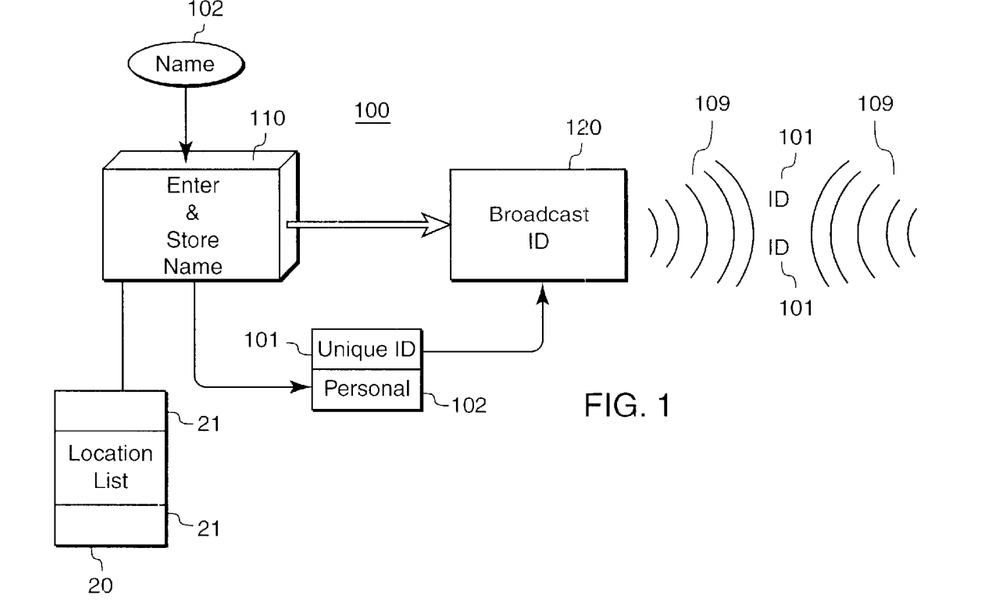
FIG. 1 is a flow diagram of an initialization process used by devices of the social network according to the invention.

As shown in FIG. 1, our invention assigns users of our invention (entities) an arbitrary, but unique identification 101, hereafter referred to as the user's unique ID. In our invention, the user or entity also associates a private identification 102 with the unique ID. The private ID can be a name, telephone number, email address, audio recording of their name, or any other form of identification that will allow others to know the identity of the user or entity from the private ID alone. Our invention, thus, creates a mapping associating the unique ID 101 with the private ID 102. The mapping is stored in a memory controlled and accessible by the user.

Figure 2:
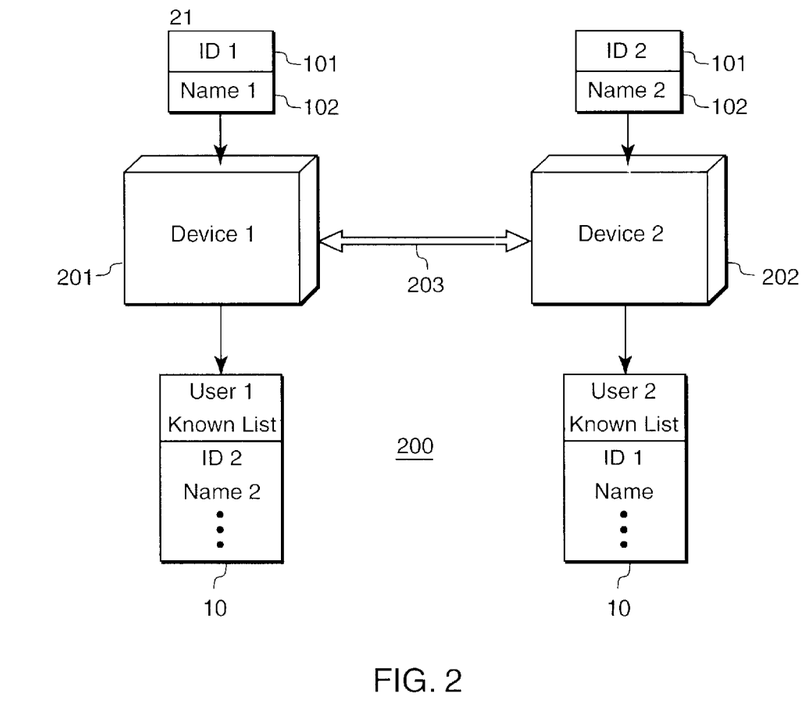
FIG. 2 is a flow diagram of a process for exchanging identifications using a point-to-point communications link.

After the user is assigned the unique ID and associates the private ID with the unique ID, the user can exchange this stored mapping of IDs with friends, as shown in FIG. 2. The exchange occurs over a secure communication channel 203, so that only trusted users can receive these mappings. The newly exchanged data are recorded in a memory. By exchanging these data, users essentially generate known lists 10 comprised of the unique and private IDs of known users.

In addition to the ability to securely exchange unique and private IDs with friends who are users of the invention, our invention also makes the unique ID 101 of the user available to unknown users (strangers), see FIG. 1. For example, the unique ID can be broadcast and received on a short-range public broadcast communication channel 109. The unique ID can then be associated with a specific location. This pairing of unique ID and location is recorded as an entry 131 in a location list 130 (FIG. 11) by our invention system.

However, it should be recognized that the invention does not need to know what activities or interests brings the two strangers to the same location, or even where the location is in the network. Instead, and as an advantage, the present invention only needs to know that at some location in the network, it does not matter where, the two strangers interacted in some undetermined manner, or shared some undetermined activity or interest. In other words, the strangers have a common context at some location without knowing either what the context or location is.

In one embodiment, our invention equips many users with portable devices that continually broadcast their unique IDs 101. In other words, the network is mobile, and the locations in the network are wherever the users operate their devices.

Other user devices, in close proximity, can receive and record the broadcasted unique IDs. This information marks an instance when at least two devices (and users) share the same close physical location. From this information one can infer a shared location between the users carrying the portable devices without knowing where the location is.

In another embodiment, the unique IDs and locations are recorded when users "visit" a virtual location, for example, web sites, newsgroups, or chat rooms on the Internet.

Figure 11:
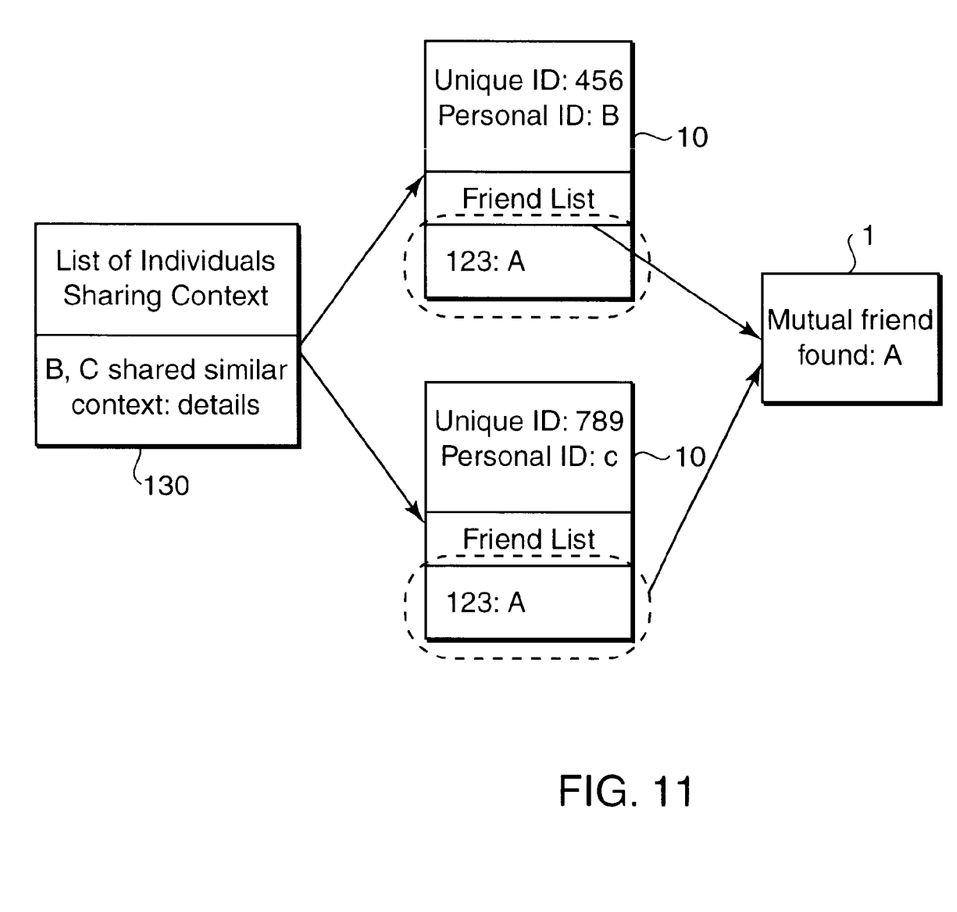
FIG. 11 is a block diagram of a process for recognizing a common friend between two strangers.

Using the pairs of unique IDs and the locations in which these unique IDs were paired, along with the known lists 10 of each user, a computer-implemented process can determine whether two or more users, who are strangers to each other, shared a virtual location. Using the same data, it can also be determined whether or not these two users share a common friend 1 as shown in FIG. 11.

When it is determined that two or more users share a common location and a mutual friend, another process can then determine whether an introduction of the strangers should be suggested via the mutual friend. The process receives the unique IDs of the two strangers who share a location, and compares their unique IDs with those on the known list 10. At this point, a message suggesting an introduction be made between the individuals can be generated.

Physical and Virtual Locations

Having described the core components of our invention, we describe two specific embodiments of our social networking invention. In a first embodiment of our invention, the shared network location is inferred through the common location of two or more users in a physical environment. Here, we use portable devices in an ad hoc mobile local communications network to maintain the lists, make the determinations to introduce two or more individuals, and generate the messages to provide social networking on a local basis. In a second embodiment, the shared location is explicitly generated in a virtual environment. Here, we use the Internet and computational processes to maintain the lists, make the determinations, and generate the messages to provide social networking on a world-wide basis.

Local Network With Implicit Physical Shared Locations

The first embodiment of our invention provides a social network for introducing individuals sharing a common location in a physical environment, henceforth referred to as a network location. A mobile local area network includes a number of portable communication devices that operate in broadcast or point-to-point communications modes depending on the function performed. The devices also include memories to store data interchanged over the broadcast and point-to-point communications channels.

Devices in the physical implementation of our invention differ from prior systems in that, with our invention, strangers are matched according to a shared network location. By sharing a network location, we mean that the two strangers frequent the same locations at the same time. For our purposes, the exact activities and interests of the strangers are irrelevant—what matters is that the strangers engage in activities in close physical proximity to one another. We rely on the premise that two strangers who frequently share the same location at the same time are likely to share a similar living context, or are engaged in common social activities. Our invention does not need to know what this shared location or activity is, it simply needs to know that there is a common network location between two strangers.

Our invention further differentiates itself by requiring a trusted third person, a mutual friend, to initiate an introduction of the two strangers. This provides a human element to mediate the introduction of two strangers who nonetheless share the same network location and a mutual friend. Devices in the physical implementation of our invention are compact, wireless communication devices, like the keyless remote devices used to operate car doors. The device can be carried unobtrusively in one's pocket.

As shown in FIG. 1, each device stores a unique ID 101 only associated with that device. The user enters the private ID 102. Each device can also store the known list 10. The list is generated by an exchange of unique and private IDs via the secure point-to-point communications channel 203 as shown in FIG. 2. For example, friends "touch" their devices together to make an electronic connection and exchange their IDs 101–102. This point-to-point connection is a secure connection so that data interchanged via this connection cannot become known to others.

Each device also broadcasts its unique ID 101 using a short range radio frequency (RF) signal 109. Thus, the "location" extends over the range a distance that the transmitted signal can be received, and no farther. When a device receives an unknown unique ID over the broadcast channel 109, that is a unique ID that is not stored in its known list 10; the unknown ID is recorded on the location list 20. The date, time, and duration of the encounter with the stranger are also stored in the memory and comprise an encounter record 21 in the location list. The process of broadcasting and receiving IDs and recording the IDs occurs automatically in the background; the users of the devices, both the broadcasters and the receivers, are unaware of this activity when it occurs. Note in contrast with prior art device, we do not need to store what the location, activity, or interest is that brings the two strangers to the same location, we only record the fact that there was an encounter somewhere.

At a later time, when two friends are again in close physical proximity, their devices broadcast and receive each other's unique IDs and recognize each other as friends. When a friend's unique ID are received, the devices of the two friends exchange their location lists 20, including the encounter records with each other either via the point-to-point or broadcast channel. After the location lists have been exchanged, each device can examine the received location list and determine if anyone on the location list is known to this device, i.e., an ID on the other device's location list is on this device's known list.

If the device does find unique IDs of the other device's location list on its known list, the device generates and displays a message suggesting an introduction between the two individuals. The user of the device, that is, the mutual friend, can then determine whether an introduction of the two strangers would be beneficial. Thus, a common, trusted third person determines whether to introduce the two strangers, and if so, the manner in which the introduction will be conducted.

Device Processes

The following sections describe the main processes that are carried out by the portable communication devices in our mobile local area network.

Initialization

FIG. 1 shows an initial process 100 used by our communication devices. Each device is equipped with the unique ID 101. The unique ID is factory installed and inaccessible to the user. In step 10, the user enters a user name or some other human understandable private ID 102, such as a telephone number, e-mail address, and the like. The private ID 102 is stored with the unique ID 101. During operation of the device in step 120, the device broadcasts 109 its unique ID 101, and listens for other unique IDs.

FIG. 2 shows a process 200 executed when two friends wish to add each other to their known lists 10. The devices 201 and 202 are electronically connected by a point-to-point private link 203, and their unique and private IDs 101–102 are exchanged. The unique and private ID 101–102 pair is stored on the known list 10. The link can be achieved by physically touching the two devices to each other, or by a short range infrared (IR) transceiver such as found on remote controls. The intent is for the private IDs to be exchanged using private communications links, while the unique IDs are exchanged using a public communications links, so that the mapping between unique and private IDs is never made available to unknown third parties.

Figure 3:
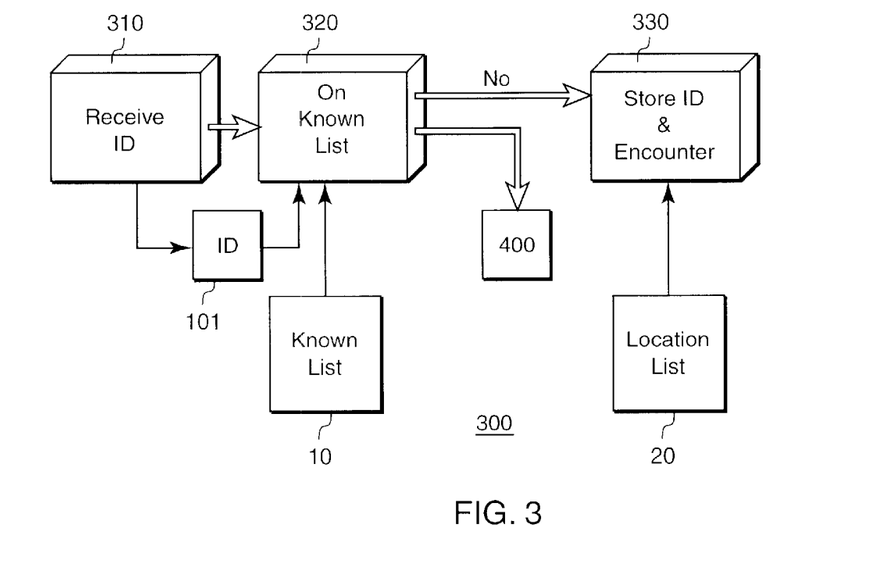
FIG. 3 is a flow diagram of a process for exchanging identifications using a broadcast communications link.

FIG. 3 shows a process 300 executed when a unique ID 101 is received in step 310 at some network location. Step 320 checks if the received unique ID is on its known list 10. If not, then step 330 adds the unknown ID to its location list 20 and also stores the date, time and duration of the encounter with the unknown ID as an encounter record. If the received ID is already stored in location list 20, than just the date, time and duration of this subsequent encounter is added. If the ID is on the known list 10 then proceed with process 400 of FIG. 4. Note, the location itself does not need to be stored.

Figure 4:
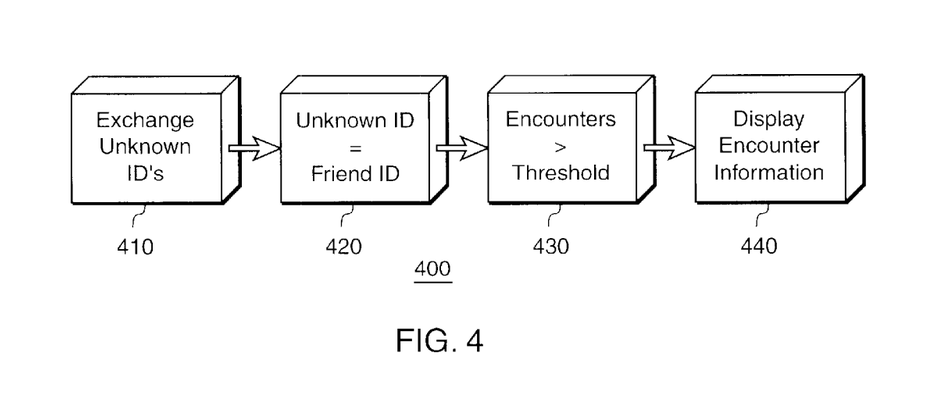
FIG. 4 is a flow diagram of a thresholding process for suggesting an introduction.

In step 410 of FIG. 4, the two friends exchange their location lists 20. In step 420, each device determines if any of the unknown unique IDs received from the other device is on its own known list 10. If any unknown IDs on the other's device's location list are on this device's known list, step 430 makes a decision of whether an introduction of the strangers should be suggested to the mutual friend. This determination can be based on the frequency of the encounters, their durations, times, and any other factors known to the system. Note again, the location itself does not need to be a factor in the thresholding decision.

If the threshold is reached, a message is generated suggesting an introduction between the two individuals who do not know each other. The message maps the unique IDs of the friends to the friends' private IDs to obtain a human-readable message. The mutual friend can then make a determination whether the two strangers, who frequently share a network location, should be introduced.

Figure 5:
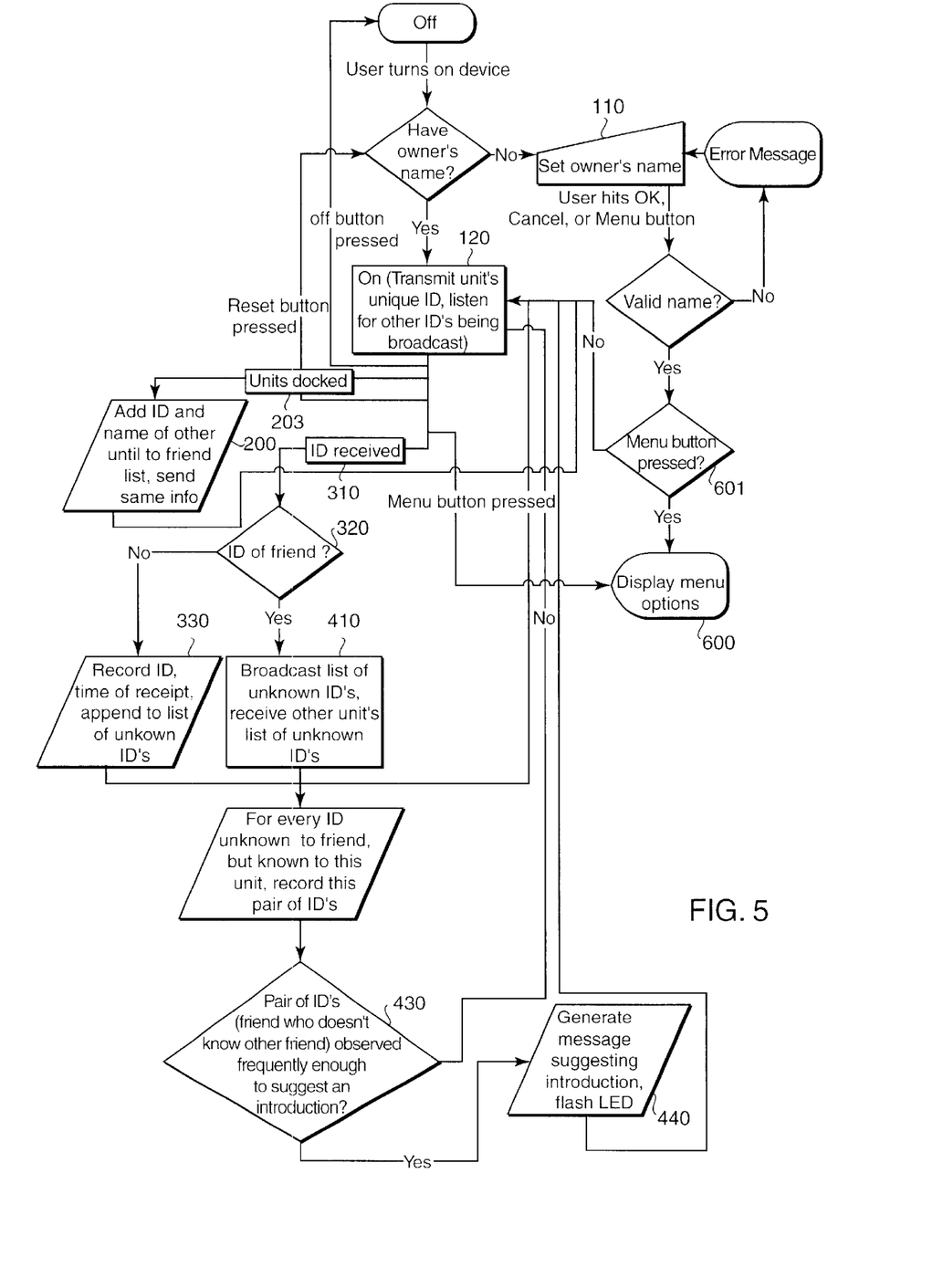
FIG. 5 is a flow diagram of state transitions in the network according to the invention.

FIG. 5 overlays the above described step to illustrate a state transition diagram of the device.

Figure 6:
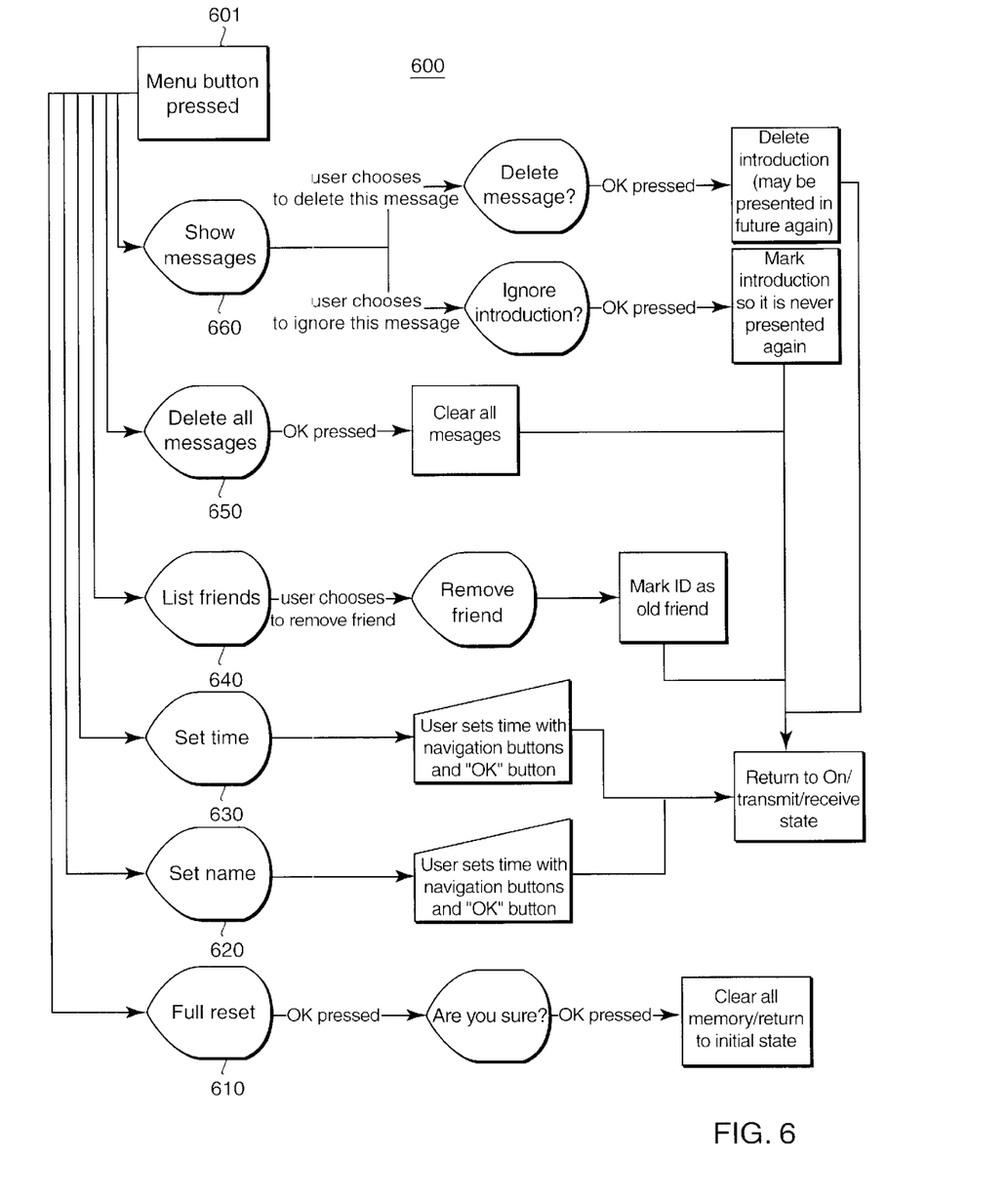
FIG. 6 is a flow diagram of menu selections used by a communication device used in the network according to the invention.

FIG. 6 shows the steps of a process 600 to execute when menu buttons of the device are pressed 601. Full reset 610 will clear all data from the memory, e.g., friends and location lists, except for the memory storing the device's own ID, after confirmation. Set name 620 activates the process 100. Set time 630 simply sets the time and date clock of the device. List friends 640 allows the user to edit the known list 10, e.g., remove IDs and names of individuals no longer considered "friends." Delete all messages 650 removes any pending messages stored in the device, and show messages 660 displays pending messages.

External Configuration

Figure 7:
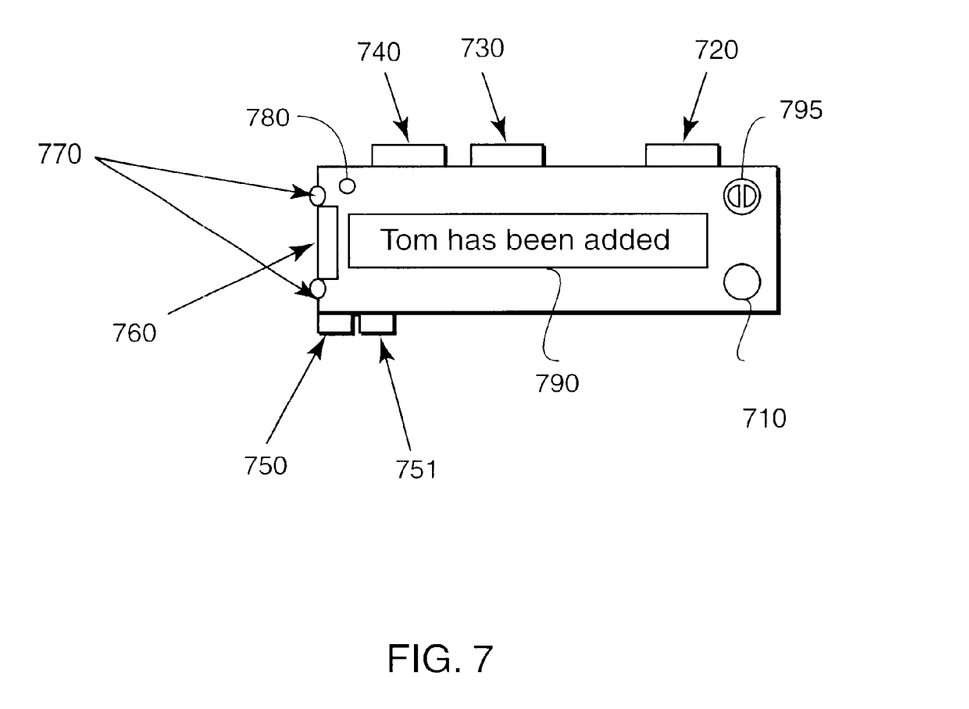
FIG. 7 is an external configuration of the a device.

FIG. 7 shows the general external structure of our communication device. The device includes the following control buttons, on/off 710, a menu 720, cancel 730, OK 740, up and down 750–751. The up and down buttons can also be implemented as a thumb wheel or slide bar, and can be used to reset the device to its initial condition, erasing all stored data except for the unique identification 101. The device also includes a physical electronic port 760, and transceiver 770, either RF, IR, or both. For output, the device also includes a message indicator 780, and a display 790, and a loudspeaker 795 which can also act as a silent mechanical vibrator.

Internal Configuration

Figure 8:
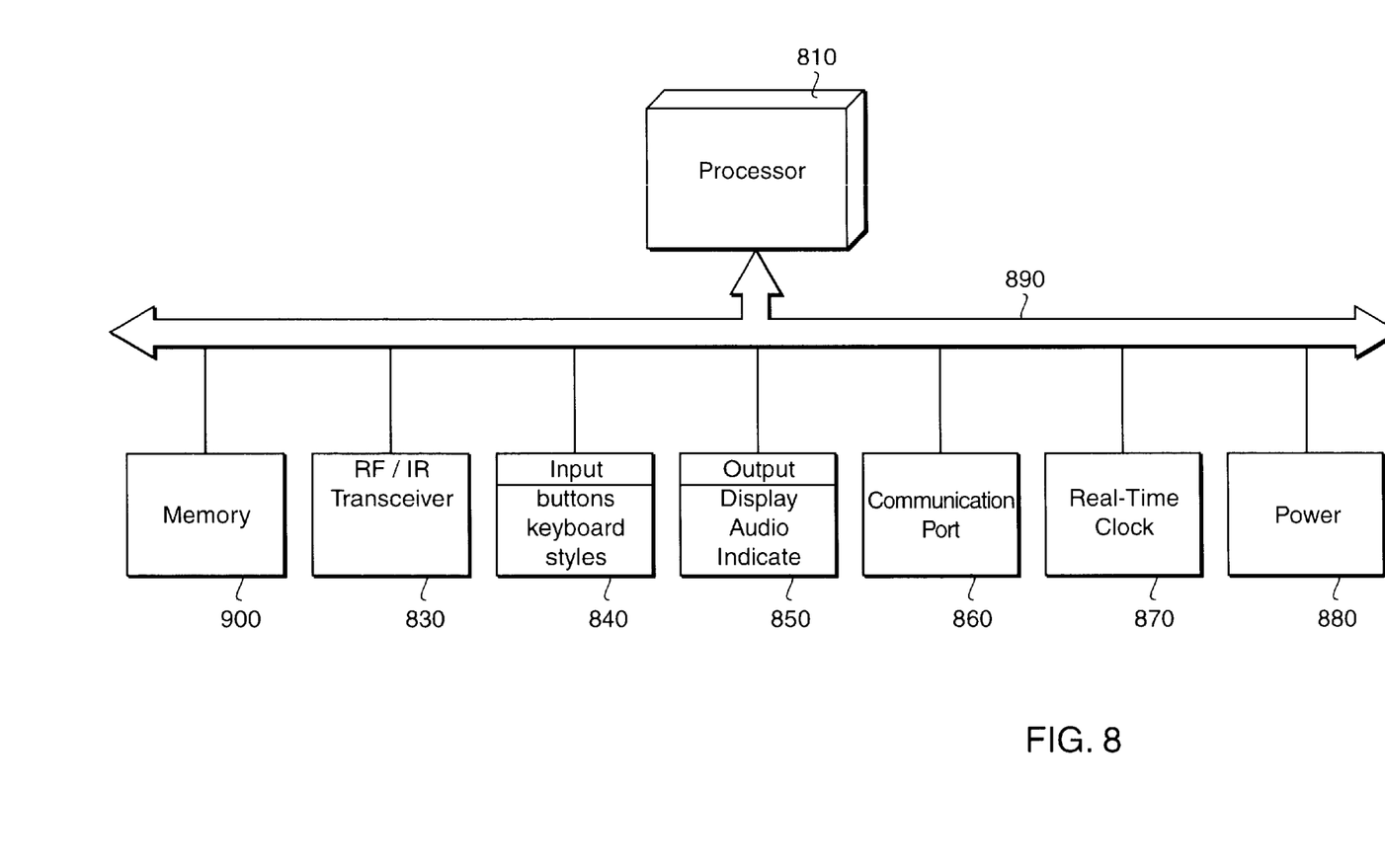
FIG. 8 is an internal configuration of the device of FIG. 7.

FIG. 8 shows the general internal structure of our device. The device includes a processor 810, a memory 900, a transceiver 830, an input interface 840, output interface 850, a communication port 860, a real-time clock 870, and a power unit 880 all connected to each other by a bus 890.

Data Structures

Figure 9:
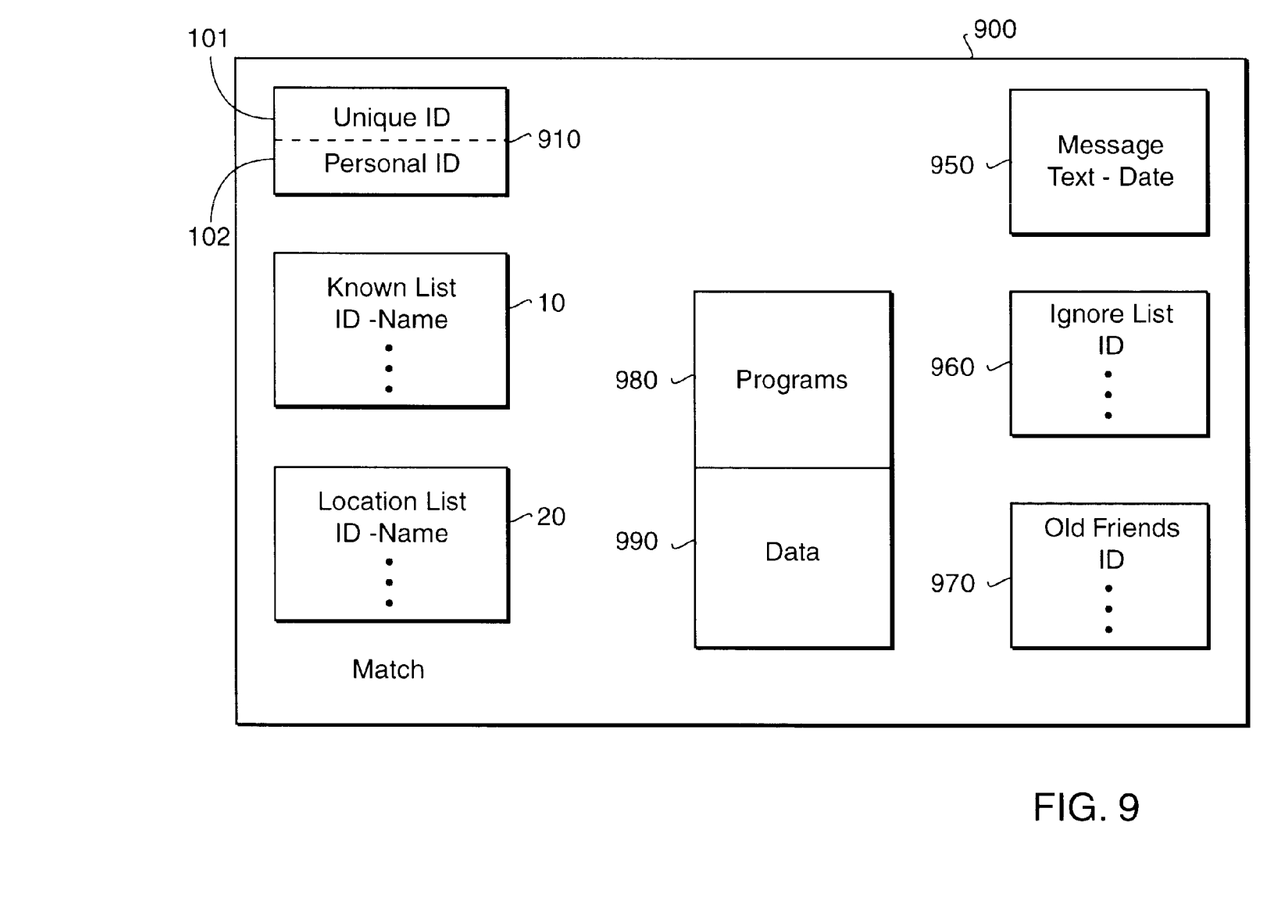
FIG. 9 is a block diagram of data structure stored in the device of FIGS. 7 and 8.

FIG. 9 shows data structures stored in the memory 900. The structure 910 stores the unique ID 101 of the device and the private ID 102, e.g., the owner's name or some other private identification. The unique ID is factory installed and cannot be changed; the user enters the private ID as shown in FIG. 1.

The known list 10 stores entries of unique and private IDs of friends. The entries in this list are generated by connecting two devices together so that the unique and private IDs can be exchanged as shown in FIG. 2.

The location list 20 stores unique IDs and encounter entries of unknown devices. The encounters are stored as encounter entries that include the date, time, and duration of the encounter.

The messages 950 store message texts. The ignore list 960 stores a list of IDs of friends, or pairs of users, who should not be introduced by this device. No introductions are suggested for individuals or pairs of users found on the ignore list.

The former known list 970 stores IDs of users who are no longer considered friends. If a device in close proximity is found to be on the former known list, no exchanges of data are performed, i.e., location lists are not exchanged. Furthermore, no introductions are suggested for users found on the former known list. Programs 980 and other data 990 used by the programs are also stored in the memory.

Additional Features

Beacons

As an additional feature, certain physical locales can be equipped with a "beacon." The beacon is a relay station to enable time delayed communication between devices. The beacon facilitates the exchange of unique IDs between devices that pass the location at different times. For example, two people might use the same sports facility at slightly different times. A beacon stores a received ID, and then re-broadcasts the ID for a short period of time after reception, for example, one hour. Beacons allow users to leave a "trace" in a particular space that maintains the same location throughout the day.

Host Configuration

We have described our devices operating in "stand-alone" configurations. However, our device can also be incorporated into other "host" portable electronic devices, such as hand-held games, cellular phones, or private digital assistants. In this case, the nature of the activities of the host device may also be known, providing additional locational information that may be used to determine when an introduction is suggested between two or more people.

Alternative Communication Links

The preferred physical implementation described in this document assumes that lists are exchanged between friends when they are physically close. However, two friends may not see each other frequently enough for this exchange to happen. For example, if one of two friends moves to a new city and regularly passes friends of the old friend in the new city, then there is no way for the device of the friend in the old city to retrieve and act upon this information. Thus, we provide alternative communication links between the devices, so that physical proximity is not required to exchange the lists of unknown IDs. An example of an alternative communication link is the Internet. In this case, the devices communicate with each other through connections on the Internet.

World-Wide Network With Explicit Virtual Shared Locations

In the physical embodiment described above, portable devices detect a shared location between individuals by noting when other devices are in the same place at the same time. While the nature of the shared location is unknown to the devices. The unique IDs of strangers' devices are known. These unique IDs, and the times at which they were observed, are recorded to mark a shared physical location between two people. At a later time, a device owned by a mutual friend receives this data and can generate a message suggesting an introduction between two strangers.

Taking the same basic concepts, we now map this design to a virtual world, for example, the Internet. In this setting, the shared locations are web pages, newsgroups, chat rooms, or other virtual locations that can be uniquely identified. However, here the number of "visitors" to a particular site can number in the millions per day. In this case, the number of "unknown" people is staggeringly large as compared to those found when navigating through the physical environment. Tracking all of these unknown unique IDs on a per-person basis is thus impractical.

Therefore, we provide means to implement our invention using a combination of computational processes and a wide area network, e.g. the Internet. Individuals still maintain unique and private IDs and lists of friends, but the method of recognizing shared location differs from the physical embodiment of this invention.

In the virtual embodiment, we provide means, e.g., a proxy, to intercept requests to virtual locations, e.g., web pages, chat-rooms, game rooms, and the like. The intercepted locations are used to maintain the location list, or a log of all the places an individual visits on the Internet.

Processes periodically exchange the location lists of friends and, for the purpose of making an introduction, determine if two strangers with a mutual friend share common virtual locations.

Figure 10:
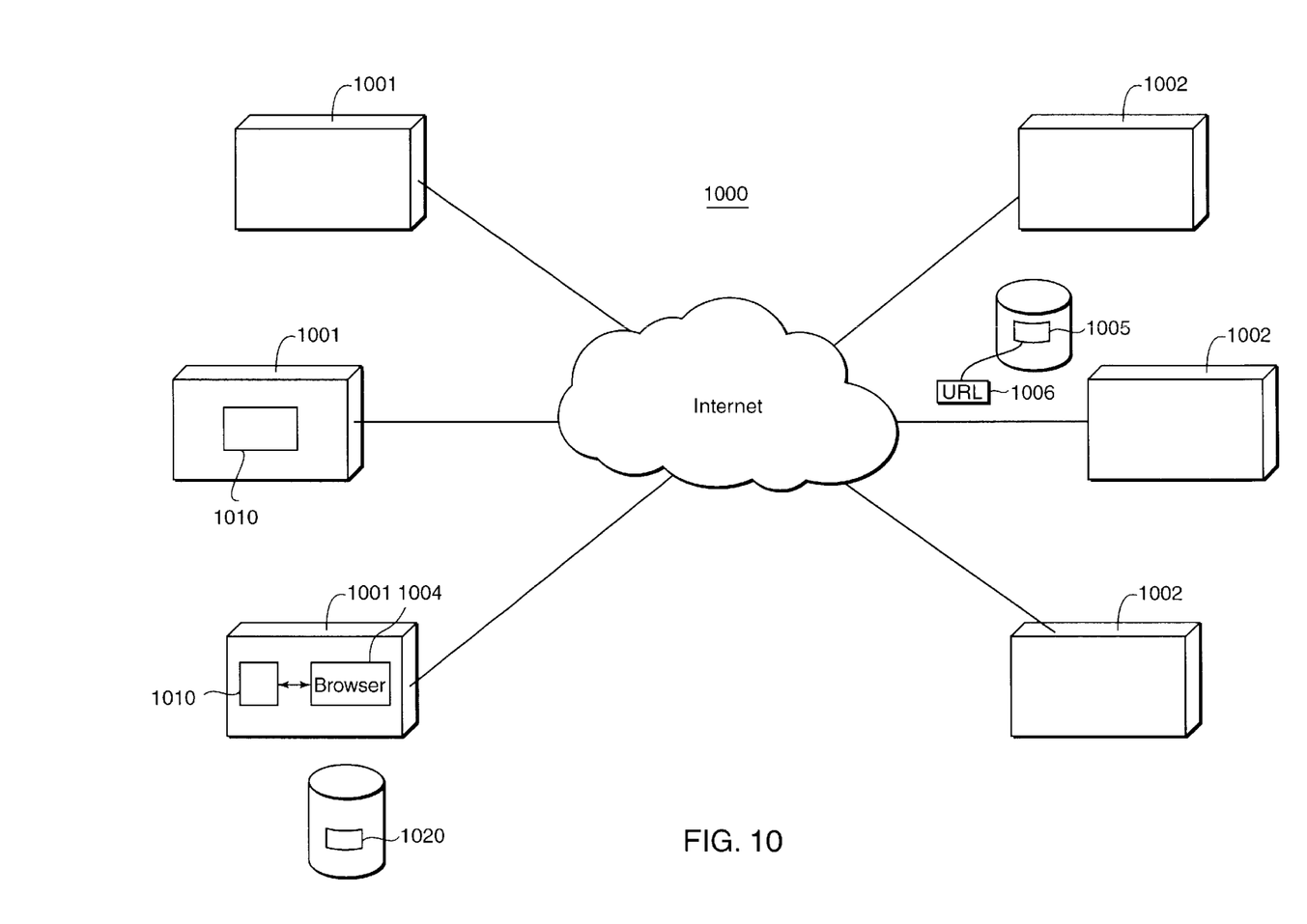
FIG. 10 is a block diagram of a virtual social network.

FIG. 10 shows a virtual network 1000 according to the second embodiment of the invention. The network includes a number of "client" computers 1001 and "server" computers 1002 connected to each other by a wide area network e.g. the Internet. In reality, the number of clients and servers number in the millions.

The clients 1001 are in most aspects conventional, i.e., workstations, PCs, laptops, cell phones, PDAs, and the like. The clients execute application programs, including a network access application such as a browser 1004. The servers are also conventional. In fact, the client and servers can be identically configured, and both can operate in either a "client" or "server" mode. Generally, it is the servers that maintain virtual locations 1005 such as sites, pages, and other "universal resources." Typically, the locations are identified by a Universal Resource Locator (URL) or some other location name 1006.

It should be noted that the clients can also maintain resources. However, in most cases, the client will need some type of rudimentary file server capability to makes such resources visible to other clients. However, it is possible for that a single client can provide two different users, i.e., strangers, access to the same local virtual location.

One application 1010 generates the unique ID 101 for each user, and associates this ID with the user's private ID 102, for example, the user's name. The application also allows two users, on friendly terms, to exchange their unique and private IDs using, for example, a secure electronic message exchange. Whenever a user requests a web page 1005 with the browser 1004, the request is intercepted by the application 1010, and an entry is made in the location list recording the URL of the request and the unique ID of the user making the request. At a later time, processes on behalf of the two friends can exchange their location lists. Subsequently, the application can execute a routine that determines if two strangers having a common friend share the same virtual location.

Privacy Concerns

In the physical world, users of our invention do not need to explicitly share interests or specific location information, rather, as stated above, the shared location is implied. In the virtual world, we need to explicitly reconstruct the visited locations. Thus, we make the processes that operate on the location lists secure.

Hybrid Implementation—Physical and Virtual Worlds

Having described implementations in both the physical and virtual worlds, we now note that these can be combined for a system that operates in both the physical and virtual worlds. In this case, all of the, components of the system are the same; the system, however, tracks location in both the physical and virtual worlds and uses this data to generate suggestions for introductions.

Additional Features Available to All Implementations

Having described the basic elements of our invention and preferred embodiments of the invention, we now describe some additional features that may be found in any embodiment of the invention.

Filtering by Time and Place

A user has the ability to enter "filter" parameters to influence when, where, and how the system operates. These parameters can, for example, block out specific days and time periods when the device should not be active. In such a case, users could specify that they are not interested in being introduced to people they encounter during working hours.

In the physical embodiment of the invention, if the device is equipped with a GPS receiver or other, similar, location-sensing equipment, users could also filter out encounters for specific geographic areas, e.g., their place of employment. In the virtual embodiment, specific locations on the Internet could be selected to be ignored in the location list.

Specifying Rules for Generating a Suggestion for an Introduction

A user can also specify the rules for determining when an introduction should be suggested. For example, in the physical embodiment, a user living in a densely populated area may require that a higher frequency of shared location be observed before an introduction is suggested. A more socially active person, on the other hand, may desire an introduction on the first encounter.

The duration of the encounters may also be used to alter the decision of when to suggest an introduction.

In the physical embodiment, the range of the transceivers can also be varied, for example, to only exchange IDs on close encounters. This can be done by measuring the signal strength, or varying the signal strength at either the sender or the receiver's end.

Ignoring Introductions

The user can be provided with the ability to flag introductions the system should ignore in the future using the ignore list 960. When an introduction is generated by the system, the mutual friend may know that the introduction should not be made, for whatever reason, and should be able to indicate to the system that this introduction should never be suggested again in the future. Similarly, a user may wish to block all introductions for a particular person, for whatever reason. This is a more proactive action then blocking a generated suggested introduction, as it instructs the system to never generate an introduction suggestion for a particular person.

Specifying Former Friends

Because relationships change, it may be desirable to designate some friends as former friends. Individuals on this list form the former known list. For individuals found on this list, location lists are not exchanged nor are introductions suggested.

Ranking Users

Our system can also consider the relative nature of a relationship between two users when determining the threshold for suggesting an introduction. When we speak of the relative nature of a relationship, we speak of a description of the type of relationship, and/or the relative positions of the individuals in the relationship. For example, one user may be more socially connected than the other user, or one user may hold a position of power over the other user. Whatever the case, a user may wish to indicate the nature of the relationship one has with another user, indicating, for example, that the friend is a co-worker, a sibling, an acquaintance, or an intimate friend. The nature of the relationship can then influence the operation of the device by, for example, influencing the threshold function used to determine when introductions should be suggested. This information can be manually inputted, or may be generated automatically by the system by, for example, measuring the frequency and duration of two friends meeting.

Specifying Intermediaries

While we have focused on the situation where one mutual friend introduces two strangers, opportunities for meeting people increase when our system considers users connected by more than one person. For example, two users may be linked through two or more mutual friends, rather than one. We thus allow the user to adjust the number of intermediaries to influence the behavior of the system.

Other Entities

So far we have described embodiments where people are introduced. However, it should be understood that the invention can also be applied to other types of entities, such as mobile agents. Mobile agents that are transmitted across a computer network are known. Mobile agents are comprised of code and data, both of which are transmitted across the computer network. Technologies such as client-server protocols, remote procedure call protocols, and distributed object technologies are employed to transmit mobile agents across the computer network. The agents typically "visit" different locations in the network to do work. Often, the agents collaborate with each other. The invention enables agents that are "strangers" to each other to start collaborations through the use of a third part agent, common to the two stranger agents.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computerized method for identifying entities accessing locations in a communications network, comprising:

associating a unique identification and a private identification with each entity accessing the network;

maintaining a known list for each entity, each entry in the known list for a particular entity including the unique identification and private identification of other entities known to the particular entity;

maintaining a location list where each entry in the location list includes a plurality of unique identifications of other entities having shared a common location in the network; and generating a message only if at least two unique identifications of a particular entry of the location list are identical to at least two unique identifications found in the known list of the particular entity, the message including the associated private identifications of the at least two identical unique identifications.

2. The method of claim 1 wherein the communications network is local and mobile, and network locations are physical.

3. The method of claim 1 wherein the communications network is wide area, and the network locations are virtual.

4. The method of claim 1 wherein the each entry in the location list is associated with an encounter record, the encounter record storing a date, time, and duration of each instance when entities have shared a common location in the network.

5. The method of claim 1 wherein the message is generated only if the number of encounter record for a particular unique identification exceeds a predetermined threshold.

6. The method of claim 2 wherein the local area network includes a plurality of portable communications devices, each communication device associated with one of the entities, and wherein each device stores the private and associated public identification, and further comprising:

broadcasting the unique identification of each device via a public communications channel;

receiving the unique identification of the other entities having shared the common shared location via the public communications channel.

7. The method of claim 1 wherein the device use a short-range radio frequency signal to broadcast the unique identification.

8. The method of claim 4 wherein devices exchange the unique and private identifications using a private point-to-point communications channel.

9. The method of claim 1 wherein the virtual network locations are identified by Universal Resource Locators.

10. The method of claim 1 wherein the private identification is a name of the entity.

11. A communications network for identifying entities accessing locations in the network, comprising:

means for associating a unique identification and a private identification with each entity accessing the network;

means for maintaining a known list for each entity, each entry in the known list for a particular entity including the unique identification and private identification of other entities known to the particular entity;

means for maintaining a location list where each entry in the location list includes a plurality of unique identifications of other entities having shared a common location in the network; and means for generating a message only if at least two unique identifications of a particular entry of the location list are identical to at least two unique identifications found in the known list of the particular entity, the message including the associated private identifications of the at least two identical unique identifications.

12. The communications network of claim 11 wherein the communications network is local and mobile, and network locations are physical.

13. The communications network of claim 12 wherein the local area network includes a plurality of portable communications devices, each communication device associated with one of the entities, and wherein each device stores the private and associated public identification, and wherein the unique identification of each device is broadcast via a public communications channel, and the unique and private identifications are exchanged using a private point-to-point communications channel.

* * * * *